United States Patent
Ritchey

(10) Patent No.: US 8,935,229 B1
(45) Date of Patent: Jan. 13, 2015

(54) SYSTEM FOR DETERMINING AND DISPLAYING LEGAL-PRACTICE TRENDS AND IDENTIFYING CORPORATE LEGAL NEEDS

(75) Inventor: Kevin L. Ritchey, St Paul, MN (US)

(73) Assignee: West Services, Inc., Eagan, MN (US)

( * ) Notice: Subject to any disclaimer, the term of this patent is extended or adjusted under 35 U.S.C. 154(b) by 641 days.

(21) Appl. No.: 11/332,783

(22) Filed: Jan. 12, 2006

Related U.S. Application Data

(60) Provisional application No. 60/643,445, filed on Jan. 12, 2005, provisional application No. 60/643,446, filed on Jan. 12, 2005.

(51) Int. Cl.
*G06F 7/00* (2006.01)
*G06F 17/30* (2006.01)

(52) U.S. Cl.
CPC ....... *G06F 17/30696* (2013.01); *Y10S 707/917* (2013.01); *Y10S 707/942* (2013.01)
USPC ........... 707/706; 707/723; 707/752; 707/917; 707/942; 705/311

(58) Field of Classification Search
CPC .................. G06F 17/30696; G06F 17/30613; G06F 17/30722; G06Q 50/18
USPC .......... 705/11, 36 R, 311; 707/9, 1, 705, 706, 707/722, 736, 752, 754, 912, 917, 942
See application file for complete search history.

(56) References Cited

U.S. PATENT DOCUMENTS

| | | | | |
|---|---|---|---|---|
| 5,634,051 A | * | 5/1997 | Thomson | 707/5 |
| 5,692,181 A | * | 11/1997 | Anand et al. | 707/102 |
| 5,794,236 A | * | 8/1998 | Mehrle | 707/5 |
| 6,038,560 A | | 3/2000 | Wical | |
| 6,178,413 B1 | * | 1/2001 | Costin | 707/1 |
| 6,311,169 B2 | * | 10/2001 | Duhon | 705/38 |
| 6,839,707 B2 | * | 1/2005 | Lee et al. | 707/8 |
| 6,859,806 B1 | * | 2/2005 | Kamarei et al. | 707/10 |
| 7,043,489 B1 | * | 5/2006 | Kelley | 707/101 |
| 7,216,115 B1 | | 5/2007 | Walters et al. | |
| 7,340,476 B2 | * | 3/2008 | Arras et al. | 707/752 |
| 2002/0010614 A1 | | 1/2002 | Arrowood | |
| 2002/0038233 A1 | | 3/2002 | Shubov et al. | |
| 2002/0133374 A1 | | 9/2002 | Agoni et al. | |
| 2003/0046277 A1 | | 3/2003 | Jackson et al. | |
| 2003/0084014 A1 | | 5/2003 | Sohrabi et al. | |

(Continued)

FOREIGN PATENT DOCUMENTS

| | | |
|---|---|---|
| JP | 2002-183356 | 6/2002 |
| WO | WO-01/11559 A1 | 2/2001 |
| WO | WO-2006/076450 A1 | 7/2006 |

OTHER PUBLICATIONS

"U.S. Appl. No. 11/331,409, Non-Final Office Action mailed Jan. 18, 2008", 17 pgs.

(Continued)

*Primary Examiner* — Marc Somers
(74) *Attorney, Agent, or Firm* — Edwards Wildman Palmer LLP; Barry Kramer; David J. Silvia

(57) ABSTRACT

The present inventor devised systems, methods, interfaces, and software that can facilitate generation and presentation of legal trend data based on legal documents, such as caselaw documents or court docket documents.

20 Claims, 10 Drawing Sheets

(56) References Cited

U.S. PATENT DOCUMENTS

| | | | |
|---|---|---|---|
| 2003/0088556 A1 | 5/2003 | Allen | |
| 2003/0195876 A1* | 10/2003 | Hughes et al. | 707/3 |
| 2004/0015329 A1 | 1/2004 | Shayegan et al. | |
| 2004/0024775 A1* | 2/2004 | Kemp | 707/102 |
| 2004/0249968 A1 | 12/2004 | Srivstava | |
| 2005/0149343 A1 | 7/2005 | Rhoads et al. | |
| 2005/0165780 A1* | 7/2005 | Omega et al. | 707/7 |
| 2005/0234968 A1* | 10/2005 | Arumainayagam et al. | 707/102 |
| 2005/0278633 A1 | 12/2005 | Kemp | |
| 2006/0089868 A1* | 4/2006 | Griller et al. | 705/10 |
| 2006/0129593 A1* | 6/2006 | Slovak et al. | 707/102 |
| 2006/0190490 A1 | 8/2006 | Ritchey et al. | |
| 2006/0235938 A1* | 10/2006 | Pennell et al. | 709/217 |
| 2007/0088738 A1* | 4/2007 | Barney et al. | 707/102 |
| 2007/0100875 A1* | 5/2007 | Chi et al. | 707/102 |
| 2009/0076836 A1* | 3/2009 | Arvidson et al. | 705/1 |

OTHER PUBLICATIONS

"U.S. Appl. No. 11/331,409, Response filed Jul. 18, 2008 to Non-Final Office Action mailed Jan. 18, 2008", 11 pgs.

"Lawyer Locator Technical Help", [online]. Martindale.com, 1999 [retrieved Dec. 27, 2007]. Retrieved from the Internet: <URL: http://web.archive.org/web/20000304122628/www.martindale.com/locator/tech_sup.html>, 2 pgs.

U.S. Appl. No. 11/331,409, Non Final Office Action mailed May 7, 2009, 14 pgs.

U.S. Appl. No. 11/331,409, Response filed Mar. 25, 2009 to Final Office Action mailed Nov. 25, 2008, 9 pgs.

U.S. Appl. No. 11/331,409, Final Office Action mailed Nov. 25, 2008, 21 pgs.

* cited by examiner

FIG. 2

SYSTEM FOR DETERMINING AND DISPLAYING LEGAL-PRACTICE TRENDS AND IDENTIFYING CORPORATE LEGAL NEEDS

RELATED APPLICATIONS

The present application claim priority to U.S. Provisional Applications 60/643,445 and 60/643,446, which were both filed on Jan. 12, 2005 and which are both incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2004, Thomson Findlaw.

TECHNICAL FIELD

Various embodiments of the present invention concern information retrieval systems, particularly those that are tailored for particular industries, such as the legal industry.

BACKGROUND

The American legal industry is a highly fragmented industry characterized by thousands of law firms working and competing to perform legal work for business clients across the country. In recent years, the competition for this work has stiffened as large corporate clients have sought cost savings by reducing the numbers of law firms they employ. Moreover, an apparent trend of law-firm consolidation and increased numbers of partner-level defections from one firm to another have further heightened the general level of competition among firms.

One problem the current inventor has recognized in the legal industry is that most if not all law firms lack sufficient business data to fully comprehend the competitive nature of the markets they serve. Accordingly, the inventor has identified a need to provide market intelligence data that law firm executives and managers can use to make better business decisions.

SUMMARY

To address this and/or other needs, the present inventor devised systems, methods, interfaces, and software that can facilitate development and/or presentation of market intelligence data to law firm executives and managers. One exemplary system aggregates information regarding legal events for corporate entities, identifies the lawyers and law firms that provided services during these legal events, classifies the legal events and corporate entities according to respective legal and industry classification systems. The system can then accept queries from users regarding a legal specialties, law firm, corporations, and industry and present specific trend data bases on the numbers of legal events over specific time periods.

BRIEF DESCRIPTION OF DRAWINGS

FIG. 2 is a facsimile of an exemplary graphical user interface 200 which corresponds to one or more embodiments of the present invention.

DETAILED DESCRIPTION OF EXEMPLARY EMBODIMENT(S)

This description, which incorporates the Figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
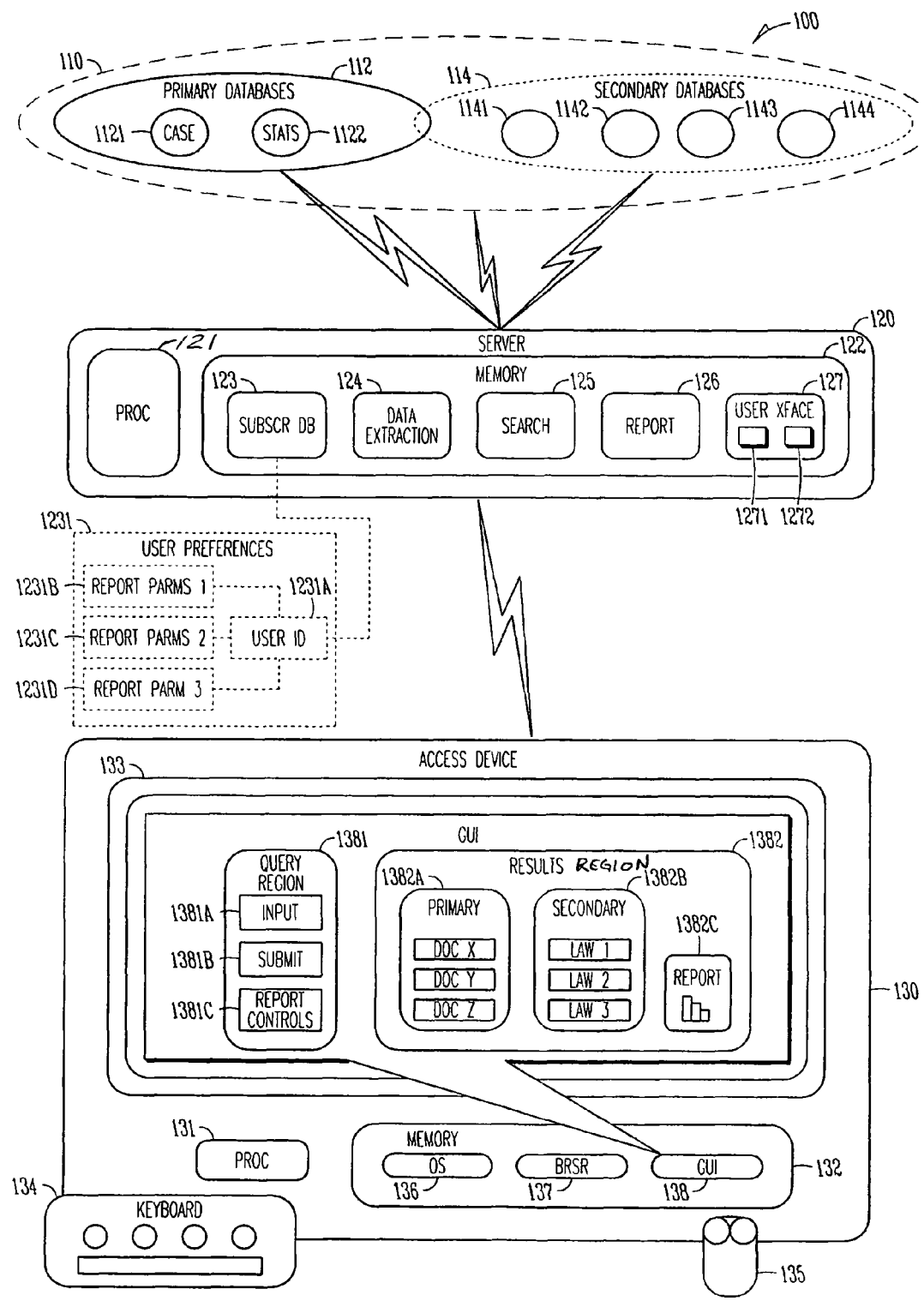
FIG. 1 is a block diagram of an exemplary information-retrieval system corresponding to one or more embodiments of the present invention.
Figure 3:
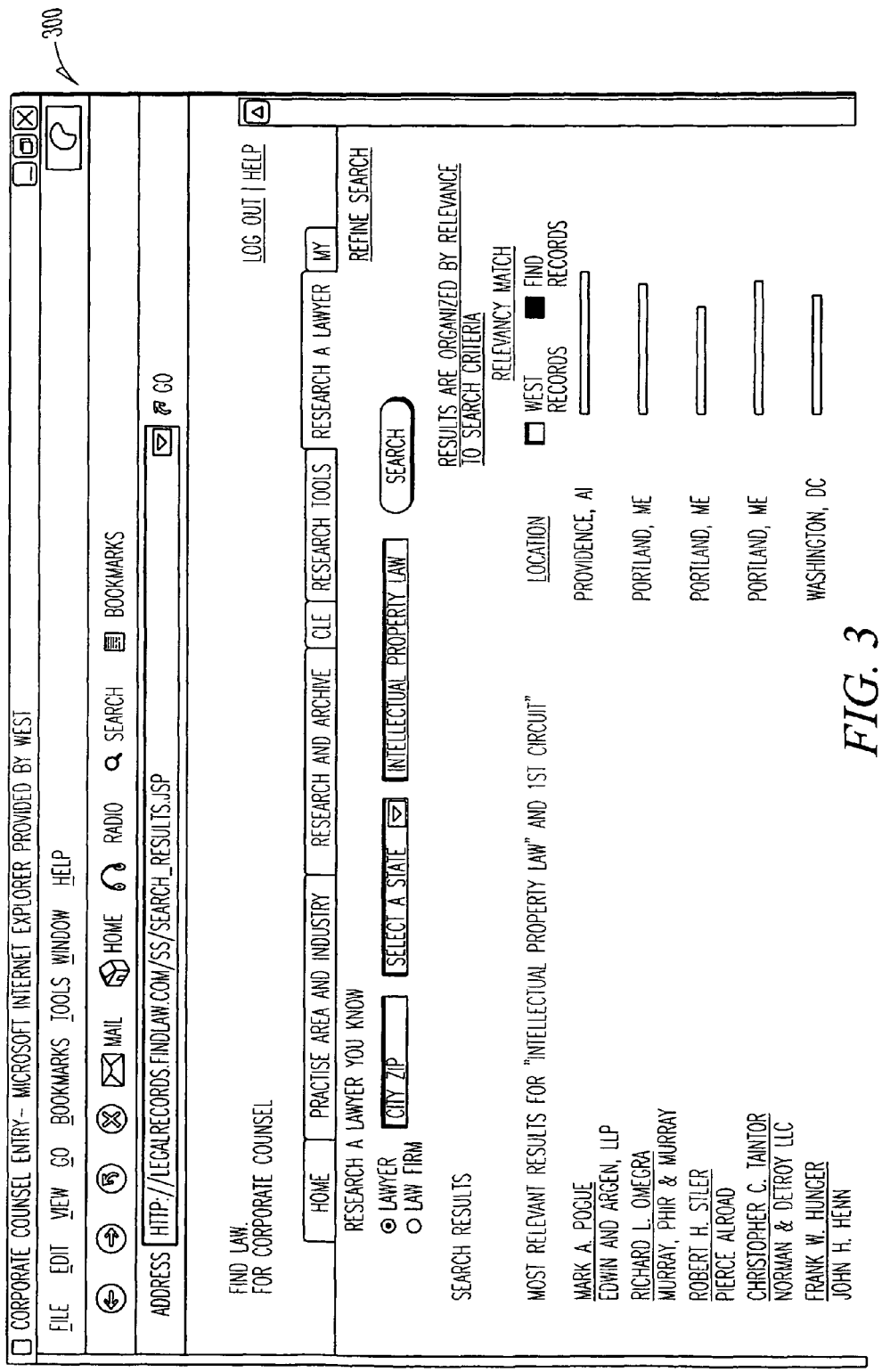
FIG. 3 is a facsimile of an exemplary graphical user interface 300 which corresponds to one or more embodiments of the present invention.

FIG. 1 shows an exemplary online information-retrieval system 100, which incorporates teachings of the present invention. System 100 includes one or more databases 110, one or more servers 120, and one or more access devices 130.

Databases 110 include a set of primary databases 112 and a set of second databases 114. Primary databases 112, in the exemplary embodiment, include a case-law database 1121 and a statutes databases 1122, which respectively include judicial opinions and statutes from one or more local, state, federal, and/or international jurisdictions. Secondary databases 114, provide attorney, judge, law firm, product, and corporate profiles as well as briefs, pleadings. More specifically, one set of databases includes one or more of the following types of content: federal court dockets, mergers and acquisition information, jury verdicts and settlements. Another set includes one or more of the following content types: patents, trademarks, copyrights, Security and Exchange Commission (SEC) filings; federal administrative decisions, AOC federal court statistics, NCSC state court statistics, press releases, news reports, website content, state dockets, state attorney general opinions, state administrative decisions, corporate filing and registration; federal and state court briefs, federal and state pleadings and motions, law reviews, bar journals, and continuing legal education (CLE) materials.

Each corporate profiles include one or more industry classification codes or indicators as well as associations to lawyer and law firm names derived from matching their names to those in documents containing references to both the corporate entity and the lawyer or law firm. In some embodiments, the case-law documents are logically associated via a data structure with documents or profiles in databases 114. Additionally, attorney or law firm profiles are associated with data structures that provide experiential ratings for the attorneys in various legal and/or jurisdictional categories of law.

The tallies may be made by counting the number of times a given attorney's name or a given law firm's name appears in court documents that pertain to a given legal specialty, such as intellectual property law, employment law, or tax. Association of documents with legal specialties or topics is based on a legal categorization system such as the KeySearch™ System, which is featured in the Westlaw™ Online Research System. Other embodiments also tally journal articles identifying a given attorney as an author. In some cases, the tally of cases or articles or other documents can be deemphasized based on the age of the cases or articles, so that more recent experience can be weighted more heavily than past experience in determining an experiential rating. (In some embodiments, alternative or supplemental experiential ratings can be determined in real-time based on user specified criteria taken alone or in conjunction with previously generated experiential data and statistics derived from caselaw and other types of documents in the databases.) Other embodiments may include non-legal databases that include financial, scientific, or health-care information.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a data-extraction module 124, a search module 125, a report engine module 126, and a user-interface module 127.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, data-extraction module 124, search module 125, report engine module 126, and user-interface module 127.

Subscriber database 123 includes subscriber-related data for controlling, administering, and managing pay-as-you-go or subscription-based access of databases 110. In the exemplary embodiment, subscriber database 123 includes one or more report generation data structures, of which data structure 1231 is representative. Data structure 1231 includes a customer or user identifier portion 1231A, which is logically associated with one or more report generation or presentation preferences, such as preferences 1231B, 1231C, and 1231D. Preference 1231B includes a default value governing whether one of more of the functions described herein is enabled or disabled. Preference 1231C includes a default value governing presentation of interfaces related to the one or more functions. Preference 1231D includes a default value governing other aspects of the one or more functions. (In the absence of a temporary user override, for example, an override during a particular query or session, the default value for trend reporting govern.) In some embodiments, data structure 1231 stores parameters or filters for defining one or more trend reports.

Data-extraction module 124 includes one or more sets of machine-executable instructions for extracting attorney identification data, court and court date information, attorney plaintiff-defendant status information, client identification data, client industry identification data, client plaintiff-defendant status information, attorney-to-client identification data, and law-firm identification data from documents in databases 110.

In some embodiments, data-extraction module 124 produces a secondary index or other form of data structures which logically associates or relates documents and/or specific data contained in those documents to specific lawyers and/or lawfirms. In some embodiments, data-extraction module 124 includes separates sets of parsers and extractors tailored for various types of documents in database 110. Additionally, some embodiments employ simple text matching of lawyer and law firms names in attorney and law firm profiles or in corporate profiles to documents that are classified according to a legal subject matter hierarchy, such as the KeySearch™ system, whereas others employ complex Bayesian matching or other intelligent techniques for inferring such data connections.

The KeySearch™ system provides the following top level of legal categories: Administrative Law, Agriculture, Alternative Dispute Resolution (ADR), Antitrust and Trade Regulation, Art, Entertainment, and Sports Law, Bankruptcy, Business Organizations, Civil Procedure, Civil Remedies, Civil Rights, Commercial Law and Contracts, Communications, Conflict of Laws, Constitutional Law, Construction Law, Criminal Justice, Education, Elections and Politics, Employment Law, Energy and Utilities, Environmental Law, Family Law, Finance and Banking, Government, Health Immigration Law, Indigenous Peoples, Insurance, Intellectual Property, International Law, Juvenile Justice, Legal Services, Maritime Law, Military Law, Products Liability, Professional Malpractice, Property—Personal, Property—Real, Science, Computers, and Technology, Securities Law, Taxation—Federal, Taxation—State and Local, Torts/Personal Injury, Transportation, Veterans, Wills, Trusts, and Estate Planning.

In some embodiments, data extraction module 124 includes web-based applications to semantically connect or link legal practitioners' customers (current or prospective) to detailed information related to the attorney's experience, relevancy (to the legal issue at hand), and context (of the customer). In addition, some embodiments enable attorneys and their customers to automatically generate reporting data to determine attorneys' and/or firms' success records, law-firm trends and history in various legal specialties, and customer (client) trends and histories with attorneys and firms who have represented them. Also, this legal-practitioner data can form "visual relationships" of attorneys with cases, judges, other attorneys, clients, publications, etc. The exemplary technology provides a comprehensive solution to tracking information on legal practitioners in the contexts of legal relevance and contextual relationships, reports, and visual relationships. While some embodiments of the present invention have this capability (for example by suggesting legal subject matter experts or related published materials in response to caselaw or legal literature queries) others, potentially more significant, provide data based on documented relationships that have been experienced between attorneys, firms, judges, and clients to produce legitimate related references.

Search module 125 includes one or more search engines for receiving and processing user queries against one or more of databases 110. In the exemplary embodiment, one or more search engines associated with search module 124 enable users to search for attorneys or law firms with demonstrated experience in a given legal issue and/or given court/judge. Attorneys and law firms are sorted by relevance, with the most experienced in a given legal issue and/or court displayed first based on experiential ranking information. This module (in cooperation with others) also enables users to find legal representation through contextual relationships on related web pages. For example, if a user is viewing a page with content related to intellectual property, the system recommends attorneys who are local (and potentially national) experts in intellectual property. Some embodiments are sensitive to whether the legal context is a local, state, or federal issue, limiting or even expanding recommendations accordingly. For example, patent law is generally a federal issue, so that attorney or firm locality may often be of lesser significance. Results can be expanded and ordered accordingly.

Report engine module 126 includes machine readable and/or executable instructions for generating and/or rendering interacting graphs based on data in databases 110 and trend report requests from a user. In the exemplary embodiment, module 126 includes instructions in accord with the description in Appendices 1 and 2 and elsewhere in this document.

User-interface module 127 includes machine readable and/or executable instruction sets for wholly or partly defining web-based user interfaces, such as search interface 1271 and results interface 1272, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft® Windows® operating system, and browser 137 takes the form of a version of Microsoft® Internet Explorer®. (However, some embodiments use other operating systems and browsers.) Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120 to implement the interfaces shown above or elsewhere in this description).

More specifically, GUI 138 includes a query region 1381 and a results region 1382. Query region 1381 includes an input feature 1381A, a submit feature 1381B, and a report control feature 1381C, which provides access to one or more other controls that enable a user to define and submit a trend report request. Input feature provides one or more input regions, such as a lawyer-law-firm selection feature, a geographic (or jurisdictional) selection feature, and a legal subject matter feature. In the exemplary embodiment, each of these control features takes the form of a hyperlink or other browser-compatible command input, and provides access to and control of query region 1381 and search-results region 1382. User selection of the control features in region 1382 results in retrieval and display of at least a portion of the corresponding document within a region of interface 138 (not shown in this figure.) Region 1382 includes regions 1382A, 1382B, and 1382C, which display respective primary, secondary, and report results. Although FIG. 1 shows region 1381 and 1382 as being simultaneously displayed, some embodiments present them at separate times.

Figure 2:
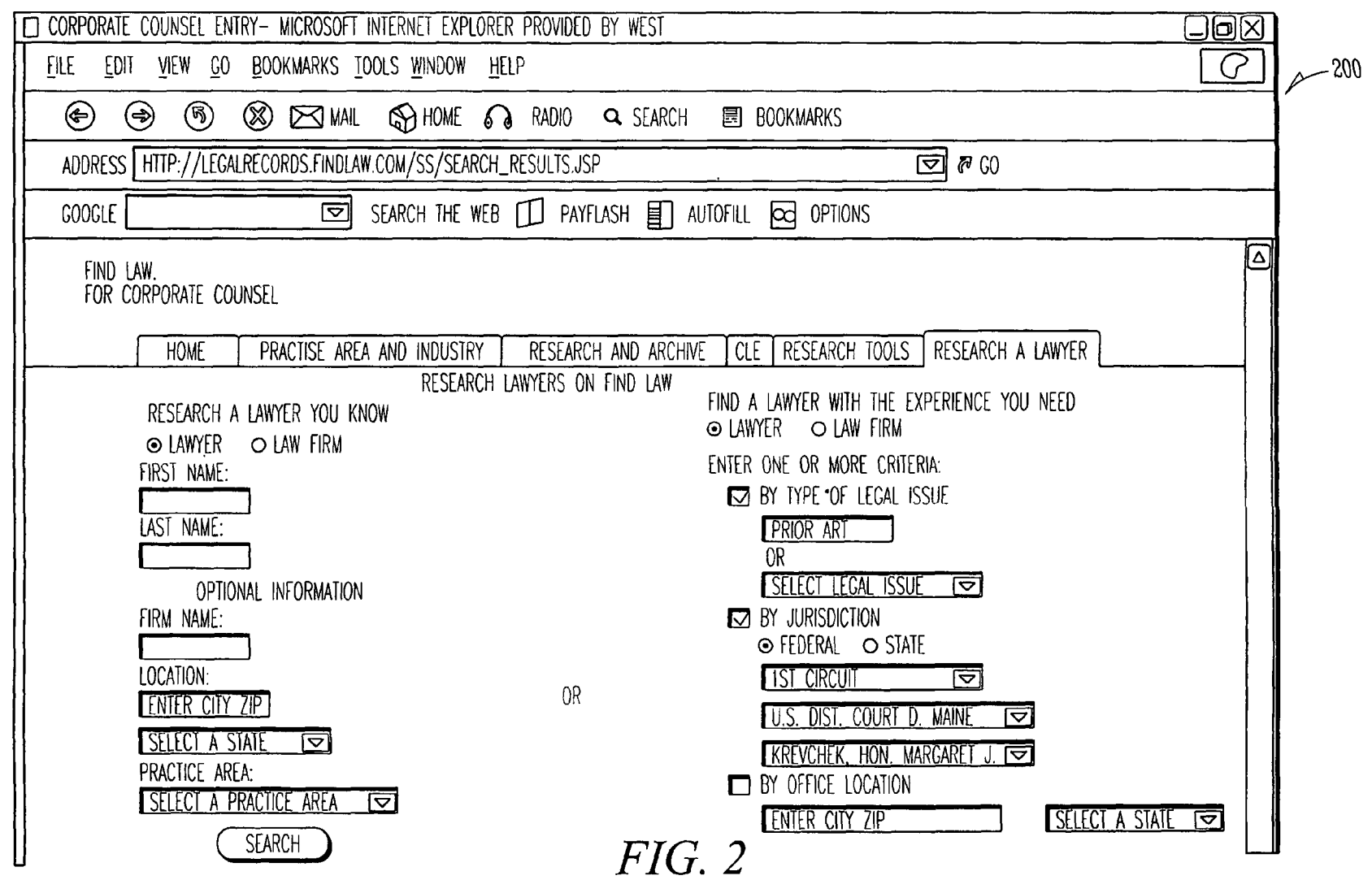
Figure 4:
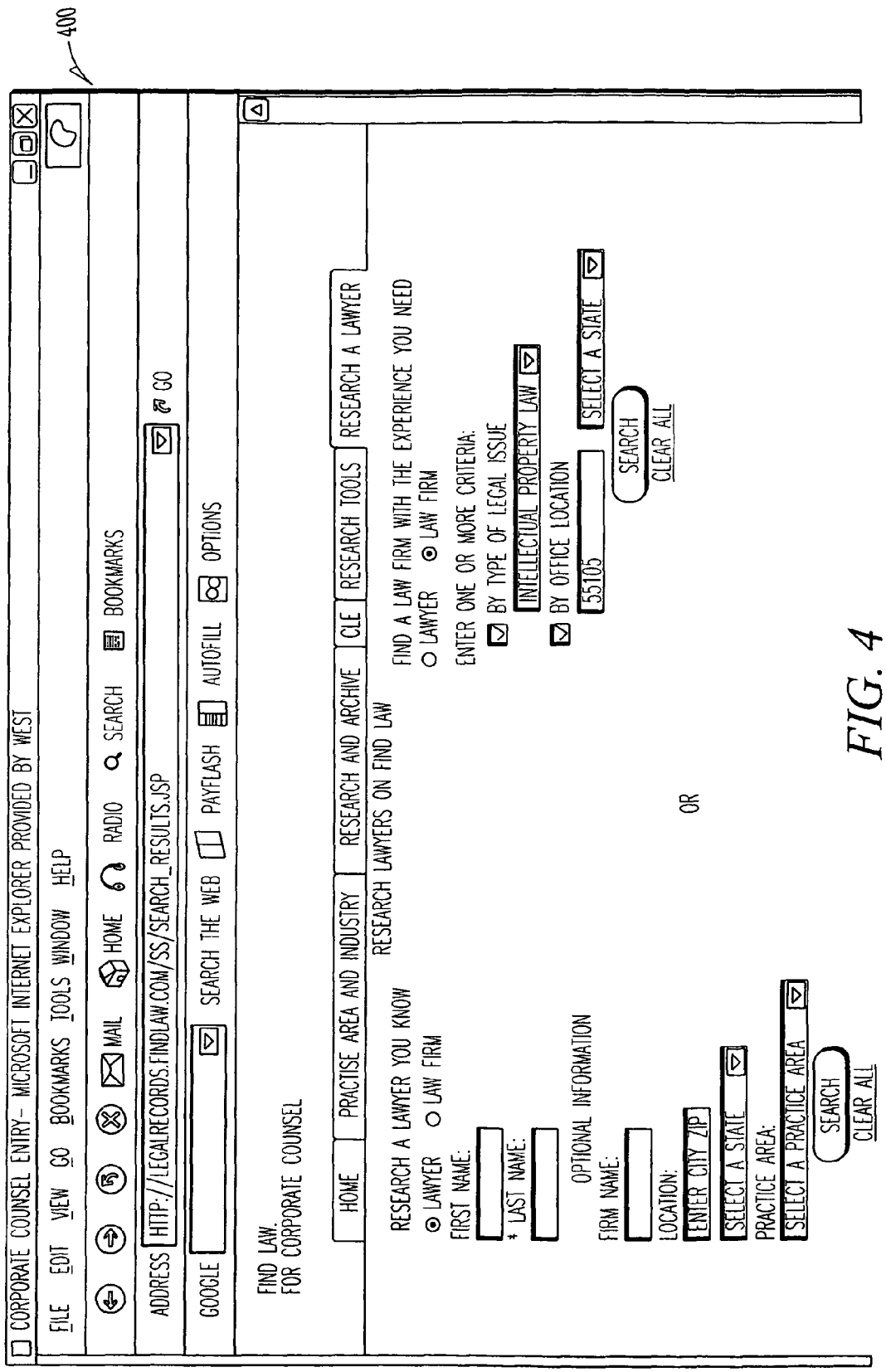
FIG. 4 is a facsimile of an exemplary graphical user interface 400 which corresponds to one or more embodiments of the present invention.
Figure 5:
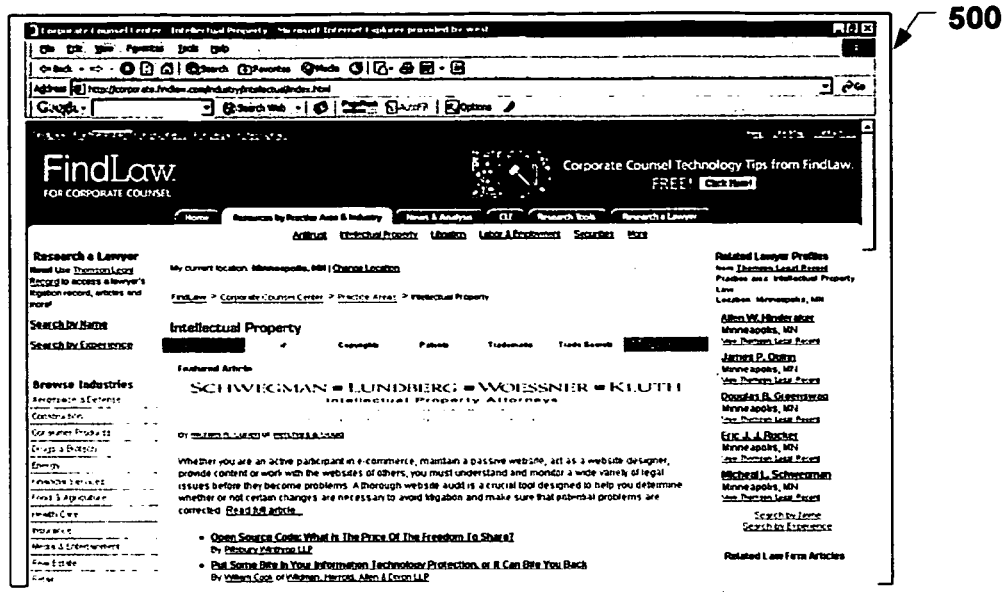
FIG. 5 is a facsimile of an exemplary graphical user interface 500 which corresponds to one or more embodiments of the present invention.

FIGS. 2-6 respectively show other exemplary interfaces 200, 300, 400, 500, and 600 that have one or more portions that may be used in place of one or more portions of GUI 138. In FIG. 2, interface 200 displays an attorney query for experts in a legal field of prior art who have tried cases under Margaret Kravchuk in Maine's First Circuit U.S. District Court. Interface 300 displays the resulting list of attorneys from the query according to their relevant litigation experience and authorship. In FIG. 4, interface 400 displays a query on intellectual-property law to be searched by law firm. In FIG. 5, interface 500 displays a list of related attorney profiles within the context of a featured article. The attorney links listed on the right portion of the screen identify attorneys with legal expertise in the field that is featured in the article. The links, in some embodiments, are listed in rank order of experience, with the most experienced lawyer listed first.

Figure 6:
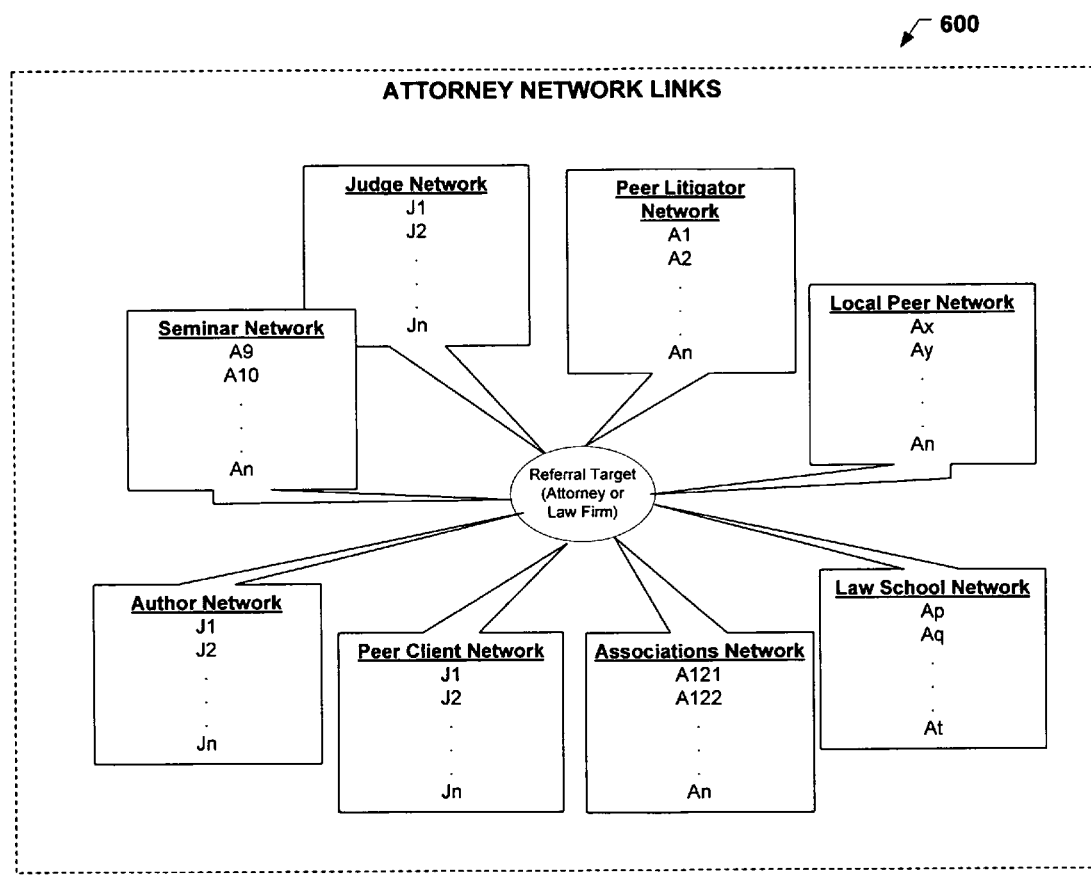
FIG. 6 is a facsimile of an exemplary graphical user interface 600 which also corresponds to one or more embodiments of the present invention.

In FIG. 6, interface 600 displays a visual relationship network for a given attorney, which in some embodiments may be a referral target or prospective lateral hire. The visual relationship network allows legal practitioners to facilitate referrals and to build an online "community" that provides associations with a variety of networks. Previous relationship-network applications only contain aggregate attorney attributes that form a limited universe of attorney information. Some embodiments use this figure as a template for a networking interface, in which a user selectively activates each cluster or family of nodes to initiate display of screens that show details, such as contact and profile information, including professional experience and third-party ratings, of people identified within the cluster. The judge network includes attorney appearances associated with judges, courts, legal matters, etc. The local peer network displays other attorneys who have appeared in front of the same judge, in the same courts, or on the same legal matters. Additional sub-networks provide information related to their titles.

Figure 9:
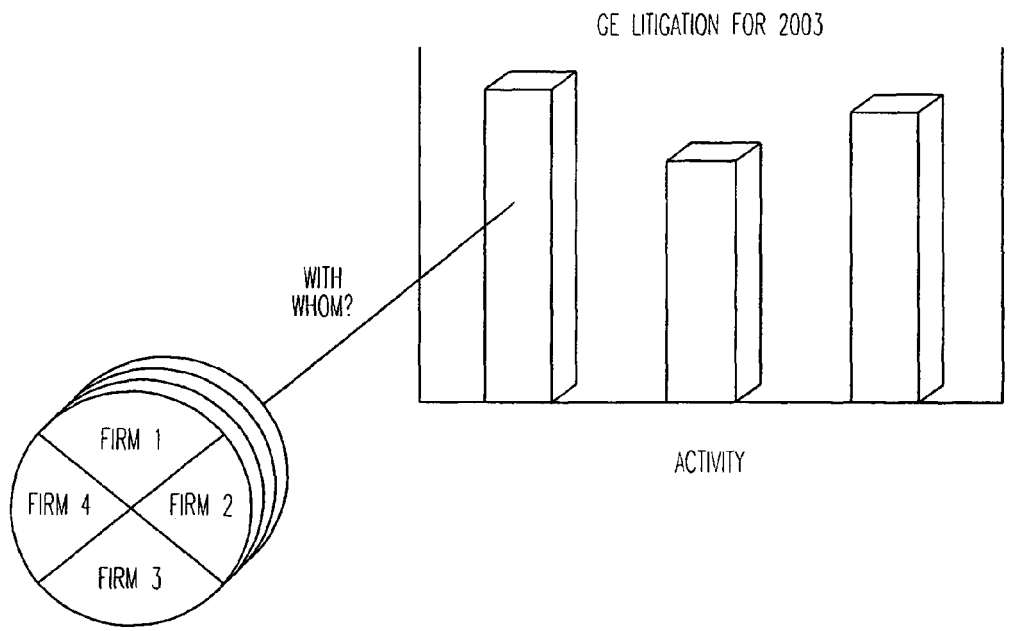
FIGS. 9, 10, and 11 are facsimiles of exemplary graphical user interfaces corresponding to one or more embodiments of the present invention.
Figure 10:
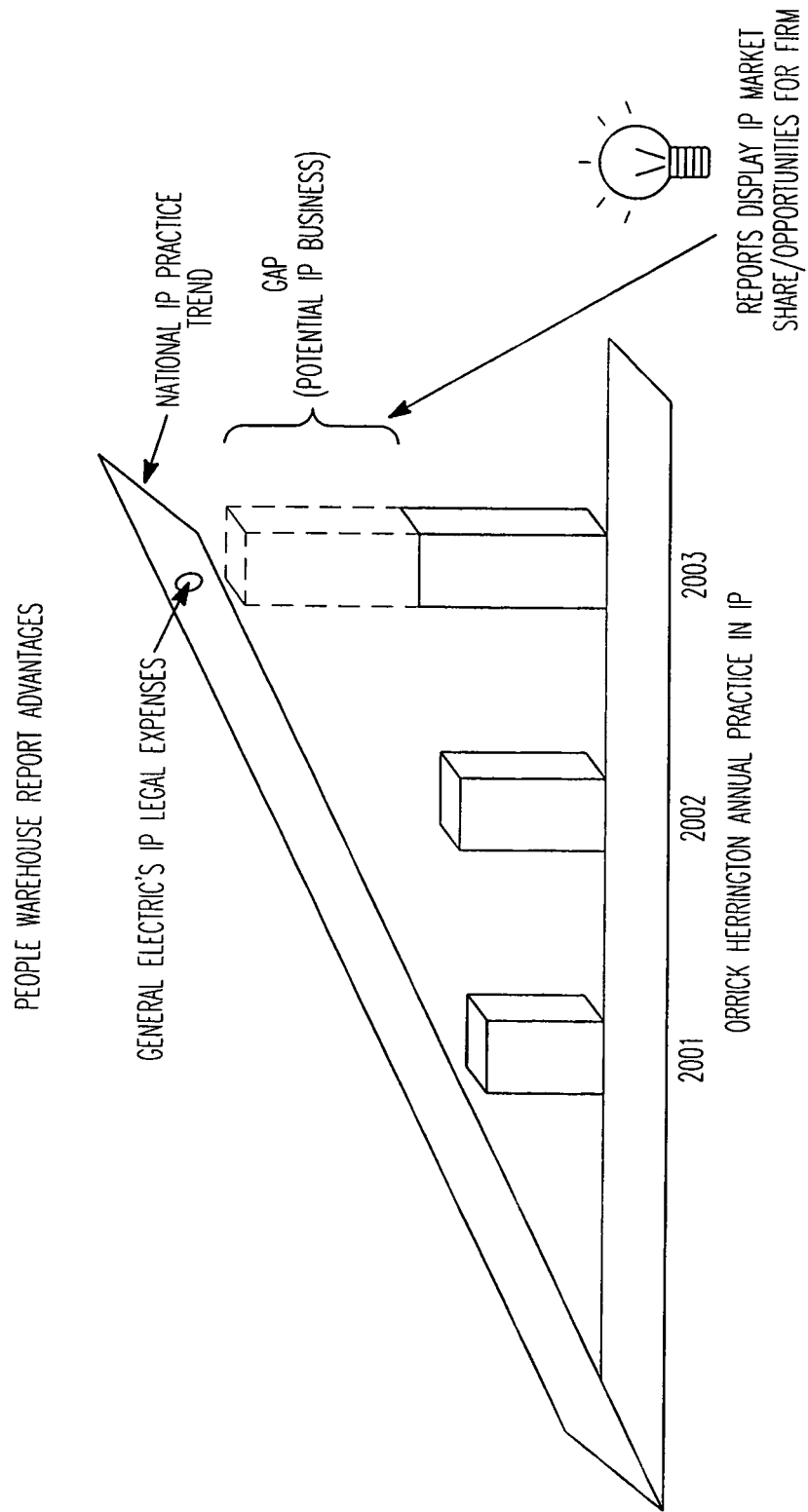
Figure 11:
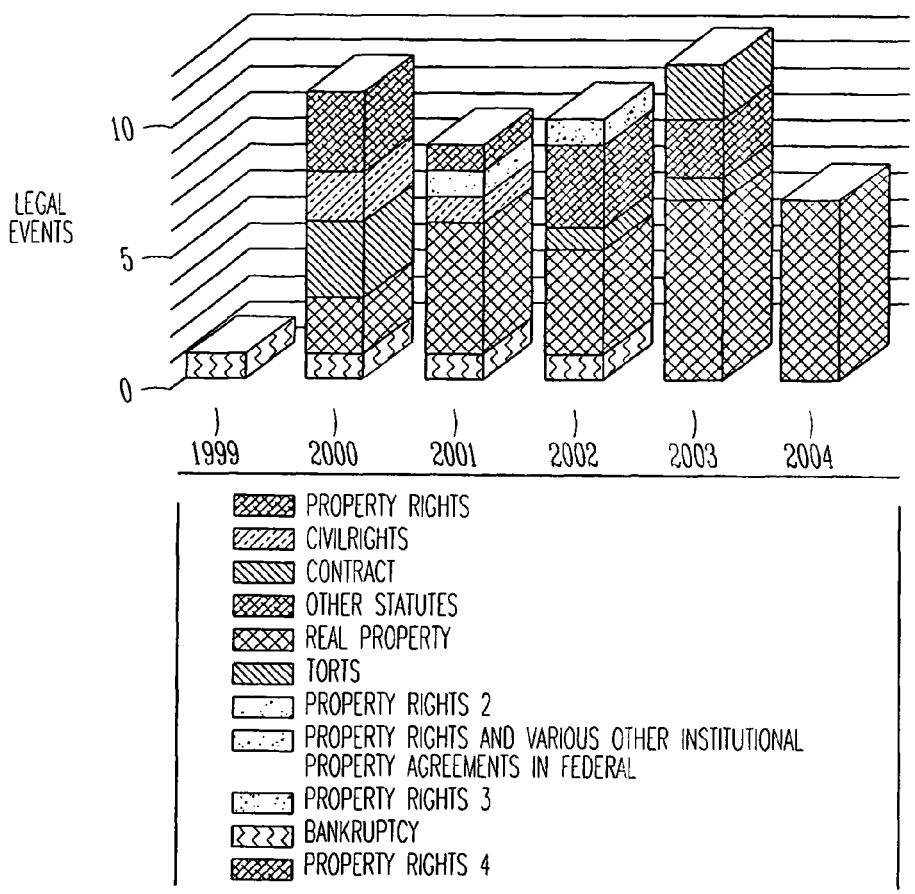

FIGS. 9, 10, and 11, as well as Appendices 1 and 2 describe various kind of reports that may be generated and displayed as part of GUI 138 as well as output to a printing device. Some embodiments also enable export of the report to a spread sheet application.

Thus, various embodiments provide users the capability to search for expertise on specific legal matters, in specific courts, before specific judges. In addition, this feature allows firms to make hiring decisions by providing a view of an attorney's litigation record that is drawn from court decisions in a proprietary online legal research service. Profiles also display a full view of a legal practitioner's litigation experience to assist in these hiring decisions. This history can also be useful in assessing potential conflicts of interest for given attorneys.

Exemplary Methods of Operating an Information-Retrieval System

Figure 7:
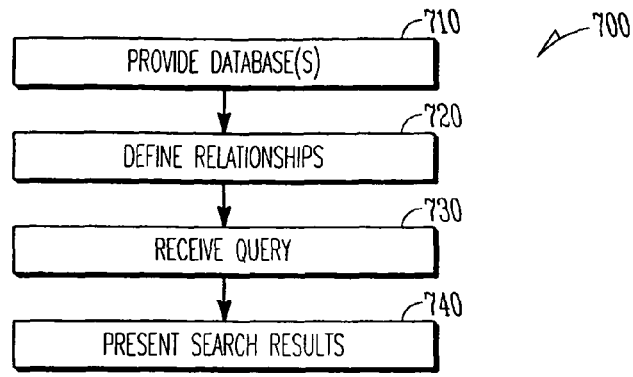
FIG. 7 is flow chart of an exemplary method corresponding to one or more embodiments of the present invention.

FIG. 7 shows a flow chart 700 of an exemplary method of operating an information retrieval system, such as system 100 in FIG. 1. Flow chart 700 includes blocks 710-740, which are arranged and described serially. However, other embodiments execute two or more blocks in parallel using multiple processors or processor-like devices or a single processor organized as two or more virtual machines or sub processors. Other embodiments also alter the process sequence or provide different functional partitions or blocks to achieve analogous results. Moreover, still other embodiments implement the blocks as two or more interconnected hardware modules with related control and data signals communicated between and through the modules. Thus, the exemplary process flow applies to software, hardware, and firmware implementations.

At block 710, the exemplary method begins with provision of a multilingual document collection—that is a collection comprising two or more documents written in two or more languages. In the exemplary embodiment, the document collection takes the form of one or more databases, such as database 110 in FIG. 1. Execution continues at block 720.

Block 720 entails defining or extracting relationships between documents in the databases. In the exemplary embodiment, this entails using data-extraction module 124 in system 100 to extract entity names from the documents and using various techniques to identify or infer relationships between the extracted names. After the one or more indices are defined, processing continues at block 730.

Block 730 entails receiving a query (or trend report request) from a user. In the exemplary embodiment, this entails a user directing a browser in a client access device, such as device 130 in FIG. 1, to an internet-protocol (IP) address for an online information-retrieval system, such as system 100, and then logging onto the system using appropriate credentials. Successful login results in a web-based search interface, such as interface 138 in FIG. 1 (or one or more portions thereof) being output from server 120, stored in memory 132, and displayed by client access device 130. The user then defines the query by interacting with the interface, specifically entering data into one or more query fields or selecting from various drop down menus, and then transmits the query to a server, such as server 120 for processing. Execution then advances to block 740 (as shown in FIG. 7).

Block 740 entails presenting a graphical user interface incorporating the data based on the request or query. In the exemplary embodiment, this entails displaying a listing of the identified set of items, such as attorneys or documents and attorneys on interface 138, 200, 300, 400, or 500, or a trend report as shown in FIGS. 9-10 or Appendices 1 or 2. In some embodiments, selection of a link associated with a listed attorney causes retrieval of a profile for the attorney, with the profile including a link to cause display of an interface, such as interface 600, which shows various networks that the respective attorney belongs to. In some variations of these embodiments, an additional charge is levied against the subscriber upon accessing interface 600 and the value-added information it provides.

Figure 8:
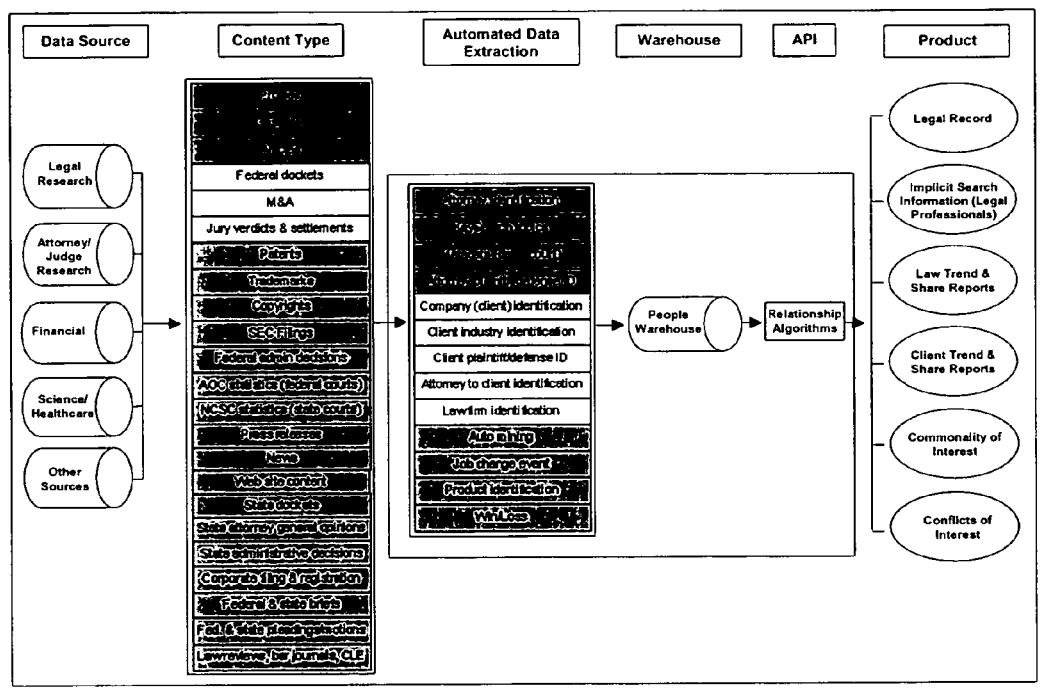
FIG. 8 is a block diagram of an exemplary method corresponding to one or more embodiments of the present invention.

FIG. 8 shows a high-level flow diagram 800 that may be employed at block 720 or within data extraction module 124. The diagram includes workflow and supporting components. Data sources (in the first column) from various proprietary repositories contain a variety of content types. In this diagram, the content types include articles, law reviews, mergers and acquisitions (M&A), and political contributions. The data-extraction column displays the programs that extract data from the content according to the functions/products the data will support. For example, the law-trend and client-trend report applications require data to be extracted by identifying the company, attorney-to-client relationship, and law-firm. In addition, auto-mining and "job change event" extraction may be used. Auto-mining is essentially the process by which an attorney is added to the content repository if he or she is not identified by the extraction program. "Job change event" extraction monitors press releases for updates to an attorney's position within his or her existing firm or another firm. Once the data is extracted by the mining programs according to function, it is placed in a "relationship authority," or relational data structure, such as an index or added as meta data to attorney and corporate profiles. An inference engine (RMS++, not shown) then processes data from the relationship algorithm into final products. This engine is built with a series of algorithms (rules) that infer the relationships of attorneys, employment information, corporate legal data, etc. For example, if Attorney A has appeared before Judge A during the same case as Attorney B, the inference rules within the engine would determine that Attorneys A and B were involved in the same case.

The invention claimed is:

1. An information retrieval system comprising:
   a database of multilingual legal documents, including a plurality of court docket documents and case law documents written in two or more languages, wherein the court docket and case law documents are logically associated with means for identifying the court docket and case law documents by lawyers, law firms, corporate entities, legal-subject classifications, and industry classifications;
   a data extraction module coupled to the database of multilingual legal documents configured and operative to define relationships amongst the multilingual documents in the database of legal documents, the data extraction module being further configured to provide at least first and second indexes wherein each first and second index defines different relationships amongst the multilingual documents in the database of legal documents prior to a user requested trend report request; and
   a server configured to communicate with the database and with a client access device, the server further configured to receive a trend report request with respect to at least one of a lawyer and a law firm from the client access device and to generate a trend report by semantically associating a lawyer or law firm with legal-subject classifications and industry classifications based on the request, with the trend report request including means for identifying a time period, at least one of a lawyer, a law firm, and at least one of a legal-subject classification and an industry classification, the server including a search module coupled to the database of legal documents configured and operative to enabling textual searching of the legal documents to identify lawyers and law firms matching a user defined parameter based upon the defined relationships of the multilingual documents in the database of legal documents wherein at least one of the lawyers or law firms are sorted by relevance when more than one lawyer or law firm is identified, the server further configured to define a graphical user interface to present information related to a plurality of social networks to which the identified lawyers belong based upon the defined relationships of the multilingual documents, wherein the plurality of social networks comprise peer litigator network, professional associations network, professional seminar network, law school network, local peer network, legal author network, peer client network and judge network.

2. The system of claim 1:
wherein the time period defines a number of years;
wherein the server is configured to determine a number of court docket documents and a number of case law documents that match the one of the legal-subject classification and the industry classification during each year of the time period criteria; and
wherein the graphical user interface is further defined to present an interactive graph with respect to at least one of a lawyer, a law firm, the plurality of social networks and a corporate entity based on the number of matching case law documents or the number of matching court docket documents for each of the years.

3. The system of claim 2, further comprising a subscriber database associated with the server, wherein the graphical user interface defined by the server includes a control feature selectable to cause storage of the time period, and the one of the legal subject classification and the industry classification in association with a user identifier for subsequent reuse.

4. The system of claim 1, wherein the plurality of court docket documents consist of:
one or more federal court dockets; and
one or more state court dockets.

5. The system of claim 1, wherein the user defined parameter includes law firms or attorneys with experience on a defined legal issue.

6. The system of claim 1, wherein the user defined parameter includes law firms or attorneys having experience with a particular judge or court.

7. The system of claim 1, wherein the search module is configured to enable a user to find legal representation through contextual relationships on related web pages.

8. A method of operating an information retrieval system, the method comprising:
providing means for searching a database of multilingual legal documents having a plurality of court docket documents and case law documents written in two or more languages by lawyer, law firm, judge, court, corporate entity, legal-subject classification, and industry classification;
providing means for defining at least first and second indexes wherein each first and second index defines different relationships amongst the multilingual documents in the database of legal documents prior to a user requested trend report request;
providing means for enabling textual searching of the plurality of court docket documents and case law documents to identify lawyers and law firms matching a user defined parameter based upon the defined relationships of the multilingual documents in the database of legal documents wherein at least one of the lawyers or law firms are sorted by relevance when more than one lawyer or law firm is identified;
receiving a trend report request including means for identifying a time period, means for identifying at least one of a lawyer, a law firm, and a corporate entity, and means for identifying at least one of a legal-subject classification, an industry classification, a particular judge and a particular courtroom;
identifying one or more of the court docket documents and case law documents based on the means for identifying the time period, the means for identifying at least one of a lawyer, a law firm, and a corporate entity, and the means for identifying at least one of the legal-subject classification, an industry classification, a particular judge and a particular courtroom;
generating a trend report by semantically associating a lawyer or law firm with legal-subject classifications and industry classifications based on the trend report request; and
defining a graphical user interface to present information related to a plurality of social networks to which the lawyer belong based upon the defined relationships of the multilingual documents, wherein the plurality of social networks comprise peer litigator network, professional associations network, professional seminar network, law school network, local peer network, legal author network, peer client network and judge network.

9. The method of claim 8:
wherein the time period defines a number of years; and
wherein the method further comprises:
determining a number of court docket documents and a number of case law documents that match the one of the legal-subject classification, the industry classification, the particular judge and the particular courtroom during each year of the time period; and
further defining the graphical user interface to present an interactive graph for at least one of a lawyer, a law firm, the plurality of social networks and a corporate entity based on the number of matching case law documents or the number of matching court docket documents or each of the years.

10. The method of claim 9, wherein further defining the graphical user interface includes defining a control feature selectable to cause storage of the time period, and the one of the legal-subject classification and the industry classification in association with a user identifier for subsequent reuse.

11. The method of claim 8, wherein the user defined parameter includes law firms or attorneys with experience on a defined legal issue.

12. The method of claim 8, wherein the user defined parameter includes law firms or attorneys having experience with a particular judge or court.

13. The method of claim 8, wherein the means for enabling textual searching is configured to enable a user to find legal representation through contextual relationships on related web pages.

14. A method of operating an information retrieval system, the method comprising:
providing a database of multilingual legal documents, including a plurality of court docket documents and case law documents written in two or more languages;
providing a data extraction module coupled to the database of multilingual legal documents configured and operative to define relationships amongst the multilingual documents in the database of legal documents, the data extraction module being further configured to provide at least first and second indexes wherein each first and second index defines different relationships amongst the multilingual documents in the database of legal documents prior to a user requested trend report request;
receiving, at a server, a trend report request including means for identifying a time period, means for identifying at least one of a lawyer, a law firm, and a corporate entity and means for identifying at least one of a legal-subject classification and an industry classification;
identifying legal documents in the database based on the means for identifying the time period, the means for identifying at least one of a lawyer, a law firm, and a corporate entity, and the means for identifying at least one of the legal-subject classification and an industry classification;
wherein the server is configured to enable textual searching of the legal documents to identify lawyers and law firms matching a user defined parameter based upon the defined relationships of the multilingual documents in the database of legal documents, wherein at least one of the lawyers or law firms are sorted by relevance when more than one lawyer or law firm is identified, the server further configured to define a graphical user interface to present information related to a plurality of social networks to which the identified lawyers belong based upon the defined relationships of the multilingual documents, wherein the plurality of social networks comprise peer litigator network, professional associations network, professional seminar network, law school network, local peer network, legal author network, peer client network and judge network; and
generating a trend report by semantically associating a lawyer or law firm with legal-subject classifications and industry classifications based on the trend report request.

15. The method of claim 14, wherein identifying legal documents based on the means for identifying the time period and the means for identifying at least one of the legal subject classification and an industry classification includes searching the database of legal documents based on means for identifying the court docket and case law documents by lawyer, law firm, and corporate entity.

16. The method of claim 14: wherein the time period defines a number of years; and
wherein the method further comprises:
determining a number of court docket documents and a number of case law documents that match the one of the legal-subject classification and the industry classification during each year of the time period; and
further defining the graphical user interface to present an interactive graph with respect to at least one of a lawyer, a law firm, the plurality of social networks and a corporate entity based on the number of matching case law documents or the number of matching court docket documents for each of the years.

17. The method of claim 16, wherein further defining the graphical user interface includes defining a control feature selectable to cause storage of the time period, and the one of the legal-subject classification and the industry classification in association with a user identifier for subsequent reuse.

18. The method of claim 14, wherein the user defined parameter includes law firms or attorneys with experience on a defined legal issue.

19. The method of claim 14, wherein the user defined parameter includes law firms or attorneys having experience with a particular judge or court.

20. The method of claim 14, wherein the search module is configured to enable a user to find legal representation through contextual relationships on related web pages.

* * * * *